3,595,914
3-NITRO-γ-RESORCYLIC ACID ANILIDES
Heinrich Ruschig, Bad Soden, Taunus, Dieter Duwel, Hofheim, Taunus, and Johann Konig, Niederhofheim, Taunus, Germany, assignors to Farbwerke Hoechst Aktiengesellschaft vormals Meister Lucius & Bruning, Frankfurt am Main, Germany
No Drawing. Filed Jan. 10, 1969, Ser. No. 790,437
Claims priority, application Germany, Jan. 18, 1968,
P 16 68 080.1
Int. Cl. C07c 103/30
U.S. Cl. 260—559                              12 Claims

ABSTRACT OF THE DISCLOSURE

Anthelmintically-active anilides of the formula

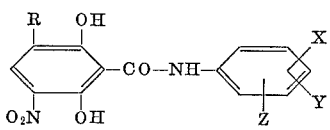

wherein R is H, Cl, Br, or I; X is halogen, $NO_2$, or $CF_3$; Y is H, $CH_3$, $CF_3$, $OCH_3$, or halogen; and Z is H, or, if Y is $OCH_3$ or halogen, then Z is H, $OCH_3$, or halogen.

---

γ-Resorcyl-anilides (=2,6-dihydroxybenzoic acid anilides) are already known; 3-nitro-γ-resorcylic acid and their simple derivatives, however, have not been known as yet.

The present invention relates to 3-nitro-γ-resorcylic acid anilides having an anthelmintic action and corresponding to the general Formula I

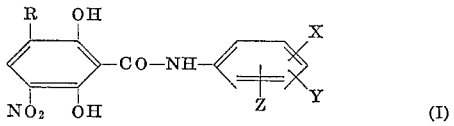

in which R represents hydrogen, chlorine, bromine or iodine, X represents a halogen atom, a nitro group or a trifluoromethyl group, and Y represents hydrogen, a methyl, trifluoromethyl or methoxy group or a halogen atom, and Z represents hydrogen or, if Y stands for methoxy or halogen, Z may have the same meaning as Y.

The present invention also relates to a process for preparing the above-identified compounds of the general Formula I, wherein (a) a 3-nitro-γ-resorcylic acid ester of the general Formula II

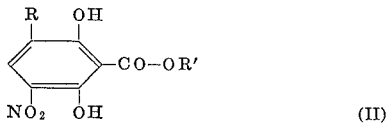

in which R has the meaning given above and R' stands for a phenyl group which may be substituted, is reacted with an aniline of the general Formula III

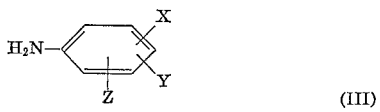

in which X, Y and Z have the meanings given above, or (b) a γ-resorcylic acid anilide of the general Formula IV

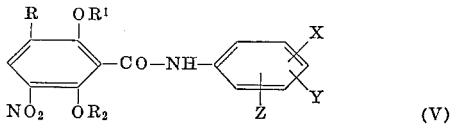

in which R, X, Y and Z have the meanings given above, is nitrated, or (c) compounds of the general Formula V

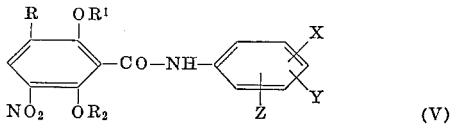

in which R, X, Y and Z have the meanings given above, and $R^1$ and $R^2$ stand for low molecular weight alkyl, aralkyl or acyl groups, are treated with ether-splitting agents and/or hydrolyzed, and, if desired, the compounds of the Formula I thus obtained, in which R stands for hydrogen, are halogenated.

According to process (a), the 3-nitro-γ-resorcylic acid anilides are obtained by reaction of 3-nitro-γ-resorcylic acid phenyl esters of the Formula II with anilines. For this reaction, there may be used, besides unsubstituted phenyl esters, also esters which are derived from substituted phenols. As examples, there may be mentioned the esters of 3-nitro-γ-resorcylic acid with cresols, anisol, phenetol, 4-nitrophenol, 2-chlorophenol, 3-chlorophenol, 4-chlorophenol or 4-bromophenol. These esters can be easily prepared from the corresponding γ-resorcylic acid esters by nitration, for example with 65% nitric acid in glacial acetic acid at 5–15° C. If in the esters of the Formula II R represents halogen, the starting materials may also be obtained by halogenation of the nitro-resorcylic acid phenyl esters (II, R=H).

As starting substances of Formula III to be used in method (a), there are used, according to the present invention, anilines whose benzene nucleus is substituted by at least one halogen atom, one nitro group or one trifluoromethyl group. As halogen atoms, any of the halogens may be used, chlorine and bromine being especially preferred. In addition to the mentioned substituents, the anilines may be substituted in all free positions by further halogen atoms, methoxy, methyl or trifluoromethyl groups.

The reaction of the 3-nitro-γ-resorcylic acid esters with substituted anilines mentioned under (a) is effected by heating a mixture of the reaction components to temperatures in the range of from 150 to 200° C. The reaction is advantageously effected in the presence of an inert solvent having a high boiling point. Especially suitable are, for example, 1,2-dichlorobenzene, 1,2,4-trichlorobenzene or 2-methylnaphthalene. The reaction is in general completed after 10 to 30 minutes. After cooling of the reaction mixture, the anilides crystallize in most cases and they can be isolated by suction-filtration.

According to method (b), the 3-nitro-γ-resorcylic acid anilides can be prepared by nitration of corresponding γ-resorcylic acid anilides. This is carried out, for example by allowing nitric acid having a density of 1.4 to react with the γ-resorcylic acid anilides at a temperature in the range of from 0 to 40° C. Advantageously, the temperature is maintained between 20 and 30° C. It is also possible to carry out the reaction in the presence of diluents such as sulfuric acid or glacial acetic acid. This method, however, does not have any advantages. After completion of the reaction, the reaction mixture is diluted with water. This anilides can then be isolated as usual. The γ-resorcylic acid anilides used as starting material can be prepared, for example, according to the method described in French Pat. 1,507,958.

According to the present invention, anilides of 3-nitro-γ-resorcylic acid can also be prepared according to method (c), by splitting off the protective groups from anilides in which the hydroxyl groups of 3-nitro-γ-resorcylic acid are protected by lower alkyl, aralkyl or acyl groups, by treatment with either-splitting agents and/or by hydrolysis. These protected 3-nitro-γ-resorcylic acid anilides can be prepared, for example, by treatment of substituted anilines with reactive acid derivatives of a 3 - nitro - γ-resorcylic acid whose hydroxyl groups are protected. It is also possible to nitrate γ-resorcylic acid anilides carrying protective groups by reaction with nitric acid.

The protective groups are split off, depending on their nature, using the usual methods. Acyl groups can be removed, by hydrolysis, for example by treatment with dilute alkalies. Alkyl or aralkyl groups can be split off, for example, by heating with hydrobromic or hydroiodic acid.

If the 3-nitro-γ-resorcylic acid anilides prepared according to the present invention do not carry a halogen atom as substituent in the 5-position (R=H), it may be introduced subsequently, if desired. For this purpose, the anilides are dissolved in suitable solvents such as glacial acetic acid, aliphatic chlorohydrocarbons or cyclic ethers, and the chlorine, bromine, iodine or another halogenating agent, for example sulfuryl chloride, is allowed to act thereupon. Advantageously, this reaction is effected at elevated temperatures. After completion of the reaction, the reaction products in many cases crystallize directy and can be isolated and purified in the usual manner.

The 3-nitro-γ-resorcylic acid anilides prepared according to the present invention are crystalline, light yellow colored substances which are sparingly soluble in water. They can in general be easily purified by recrystallization from suitable solvents.

The novel anilides of 3-nitro-γ-resorcylic acid are distinguished by a marked anthelmintic activity. This activity is especially directed against liver flukes, in particular against the great liver fluke *Fasciola hepatica*. This anthelmintic activity can be demonstrated when using rats and rabbits as test animals. In practice, however, the infestation of sheep with liver flukes has considerable importance. In combatting these infestations, the products of the present invention have proved to be valuable chemotherapeutic agents. They can be administered perorally or subcutaneously; the mode of administration depends on the individual case. The following table lists the doses of some products of the invention whose single administration to naturally strongly infested sheep resulted in complete cessation of the excretion of eggs and in a complete liberation from liver flukes.

TABLE.—CHEMOTHERAPEUTIC TESTS
[Host: sheep—Parasite: *Fasciola hepatica*]

| Substance | Mode of administration | Therapeutic dose (mg./kg. of body weight) |
|---|---|---|
| 3-nitro-2,6-dihydroxybenzoic acid-4′-nitroanilide. | Peroral | <50 |
| 5-chloro-3-nitro-2,6-dihydroxybenzoic acid-4′-chloroanilide. | do | 4 |
| 3-nitro-2,6-dihydroxybenzoic acid-2′,4′,6′-tribromoanilide. | do | <25 |
| 3-nitro-2,6-dihydroxybenzoic acid-3′-5′-bis-(trifluoromethyl)-anilide. | Subcutaneous | <5 |

The indicated doses were tolerated by the animals without side effects.

Hence, the products of the present invention are valuable medicaments in veterinary medicine for combatting liver fluke infestations.

The followiig examples illustrate the invention but they are not intended to limit it thereto:

EXAMPLE 1

3-nitro-2,6-dihydroxybenzoic acid-4′-chloroanilide 26 g. of 4-chloroaniline, 55 g. of 3-nitro-2,6-dihydroxybenzoic acid phenyl ester and 120 ml. of 1,2,4-trichlorobenzene were heated together for 30 minutes to 180° C. After cooling, the crystals were separated by filtration with suction, washed with 80 ml. of benzene and recrystallized from dioxane. 51 g. of 3 - nitro - 2,6 - dihydroxybenzoic acid-4′-chloroanilide were obtained. Melting point 198–200° C.

Preparation of the γ-resorcylic acid phenyl ester used as the starting substance:

62 ml. of HNO₃ having a strength of 65% were added dropwise, within one hour, while stirring and cooling, to 46 g. of 2,6-dihydroxybenzoic acid phenyl ester dissolved in 160 ml. of glacial acetic acid in such a manner that the internal temperature was maintained below +10° C. The whole was further stirred for 20 minutes at a temperature of up to +10° C., the crystals that had precipitated were filtered off with suction, washed with 50 ml. of glacial acetic acid, 180 ml. of water and dried at room temperature. Yield: 40 g. Melting point: 119–121° C. After recrystallization from CCl₄, the pure 3-nitro-2,6-dihydroxybenzoic acid phenyl ester melts at 121–123° C.

EXAMPLE 2

3-nitro-2,6-dihydroxy-benzoic acid-4′-bromoanilide 26 g. of 4-bromoaniline, 41 g. of 3-nitro-2,6-dihydroxybenzoic acid phenyl ester and 120 ml. of 1,2-4-trichlorobenzene were heated together for 25 minutes to 185° C. After cooling, the crystals were filtered off with suction, washed with 50 ml. of benzene and recrystallized twice from dioxane. 41 g. of 3-nitro-2,6-dihydroxybenzoic acid-4′-bromoanilide were obtained. Melting point 201–203° C.

EXAMPLE 3

3-nitro-2,6-dihydroxybenzoic acid-4′-chloroanilide 13.1 g. of 2,6-dihydroxybenzoic acid-4′-chloroanilide were introduced within 5 minutes, while stirring, into 120 ml. of HNO₃ (d=1.40) in such a manner that the internal temperature did not exceed 30° C. The whole was stirred for 2 hours at 25–30° C., diluted with 120 ml. of water while cooling, the crystals were filtered off with suction and washed with 80 ml. of water. After recrystallization from dioxane, 8.0 g. of 3-nitro-2,6-dihydroxybenzoic acid-4′-chloroanilide were obtained. Melting point 198–200° C.

EXAMPLE 4

3-nitro-2,6-dihydroxybenzoic acid-4′-bromoanilide 15.4 g. of 2,6-dihydroxybenzoic acid-4′-bromoanilide were introduced, while stirring, within 5 minutes into 125 ml. of HNO₃ (d=1.40) in such a manner that the internal temperature did not exceed 30° C. The whole was stirred for 2 hours at 25–30° C., diluted with 125 ml. of water while cooling, the crystals were filtered off with suction, washed with 130 ml. of water and recrystallized from dioxane. 10.2 g. of 3-nitro-2,6-dihydroxybenzoic acid-4′-bromoanilide were obtained. Melting point 201° C.

In a manner analogous to the methods described in the Example 1 to 4, the following compounds were obtained:

3 - nitro - 2,6-dihydroxybenzoic acid-3′,4′-dichloroanilide—M.P.=205–206° C.

3 - nitro - 2,6 - dihydroxybenzoic acid-2′,4′,6′-trichloroanilide—M.P.=206–207° C.

3 - nitro - 2,6 - dihydroxybenzoic acid-2′,4′,6′-tribromoanilide—M.P.=212–213° C.

3 - nitro - 2,6 - dihydroxybenzoic acid-2′-methoxy-4′-chloroanilide—M.P.=225–226° C.

3 - nitro - 2,6 - dihydroxybenzoic acid-4′-nitroanilide—M.P.=248° C. (dec.)

3 - nitro - 2,6 - dihydroxybenzoic acid-2′,5′-dimethoxy-4′-chloroanilide—M.P.=200° C.

3 - nitro - 2,6 - dihydroxybenzoic acid-3′,5′-bis-trifluoromethylanilide—M.P.=178–179° C.

EXAMPLE 5

5-chloro-3-nitro-2,6-dihydroxybenzoic acid-4'-chloroanilide 10.5 g. of 5-chloro-3-nitro-2,6-dihydroxybenzoic acid phenyl ester, 5.0 g. of 4-chloroaniline and 25 ml. of 1,2,4-trichlorobenzene were heated together, for 10 minutes, to 180° C. After cooling, the crystals that had formed were filtered off with suction, washed with 30 ml. of ethanol and recrystallized from dioxane. 8.6 g. of 5-chloro-3-nitro-2,6-dihydroxybenzoic acid-4'-chloroanilide were obtained. Melting point 210° C. (decomposition).

Preparation of the γ-resorcylic acid ester used as the starting substance:

14 g. of 3-nitro-2,6-dihydroxybenzoic acid phenyl ester in 25 ml. of glacial acetic acid were heated for 5 minutes with 7.5 ml. of sulfuryl chloride to 70° C. The whole was then allowed to stand for 15 hours at room temperature, the crystals were filtered off with suction and washed with 15 ml. of benzene. Upon recrystallization from benzene, 10.7 g. of 5-chloro-3-nitro-2,6-dihydroxybenzoic acid phenyl ester were obtained. Melting point 145° C.

EXAMPLE 6

5-chloro-3-nitro-2,6-dihydroxy-benzoic acid-4'-chloroanilide 21 g. of 3-nitro-2,6-dihydroxybenzoic acid-4'-chloroanilide, 105 ml. of glacial acetic acid and 12 g. of sulfurylchloride were heated together, while stirring, for 90 minutes to 80° C. After cooling, the crystals were filtered off with suction, washed with 40 ml. of ethanol and recrystallized from dioxane. 18 g. of 5-chloro-3-nitro-2,6-dihydroxybenzoic acid-4'-chloroanilide were obtained. Melting point 209–210° C. (decomposition).

EXAMPLE 7

5-bromo-3-nitro-2,6-dihydroxy-benzoic acid-4'-chloroanilide 30.8 g. of 3-nitro-2,6-dihydroxybenzoic acid-4'-chloroanilide were heated in 100 ml. of dioxane to 95° C. Then, a suspension of the bromo-dioxane complex (from 17 g. of bromine and 55 ml. of dioxane) was added in one portion, the whole was heated for 2 minutes to the boiling temperature, during which time a slution was formed under evolution of HBr. After cooling, the crystals were filtered off with suction, washed with 35 ml. of dioxane; 32 g. or 5-bromo-3-nitro-2,6-dihydroxybenzoic acid-4'-chloroanilide were thus obtained. Melting point 201° C. (decomposition).

We claim:
1. 3-nitro-2,6-dihydroxybenzoic acid 3',5' - bis-trifluoromethylanilide.
2. 3 - nitro - 2,6 - dihydroxybenzoic acid-4'-chloroanilide.
3. 3 - nitro - 2,6 - dihydroxy-benzoic acid-4'-bromoanilide.
4. 5 - chloro - 3 - nitro - 2,6-dihydroxybenzoic acid-4'-chloroanilide.
5. 5 - bromo - 3 - nitro-2,6-dihydroxybenzoic acid-4'-chloroanilide.
6. 3 - nitro - 2,6 - dihydroxybenzoic acid-2',4',6'-tribromoanilide.
7. 3 - nitro - 2,6 - dihydroxybenzoic acid-4'-nitroanilide.
8. 3 - nitro - 2,6 - dihydroxybenzoic acid-3',4'-dichloroanilide.
9. 3 - nitro - 2,6 - dihydroxybenzoic acid-2',4',6'-trichloroanilide.
10. 3 - nitro - 2,6-dihydroxybenzoic acid-2'-methoxy-4'-chloroanilide.
11. 3 - nitro - 2,6 - dihydroxybenzoic acid-2'-5'-dimethoxy-4'-chloroanilide.
12. A resorcylic acid anilide of the formula

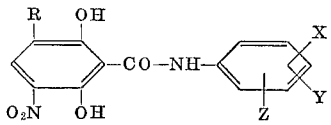

wherein R is hydrogen, chlorine, bromine, or iodine; X is chlorine, bromine, or iodine, nitro, or trifluoromethyl; Y is hydrogen, methyl, trifluoromethyl, methoxy, chlorine, bromine or iodine; and Z is hydrogen or, when Y is methoxy, chlorine, bromine, or iodine, then Z may have the same meaning as Y.

References Cited

UNITED STATES PATENTS 3,449,420   11/1969   Ruschig et al. _____ 260—559

HENRY R. JILES, Primary Examiner

H. I. MOATZ, Assistant Examiner

U.S. Cl. X.R.
260—471; 424—324